Figure 1:
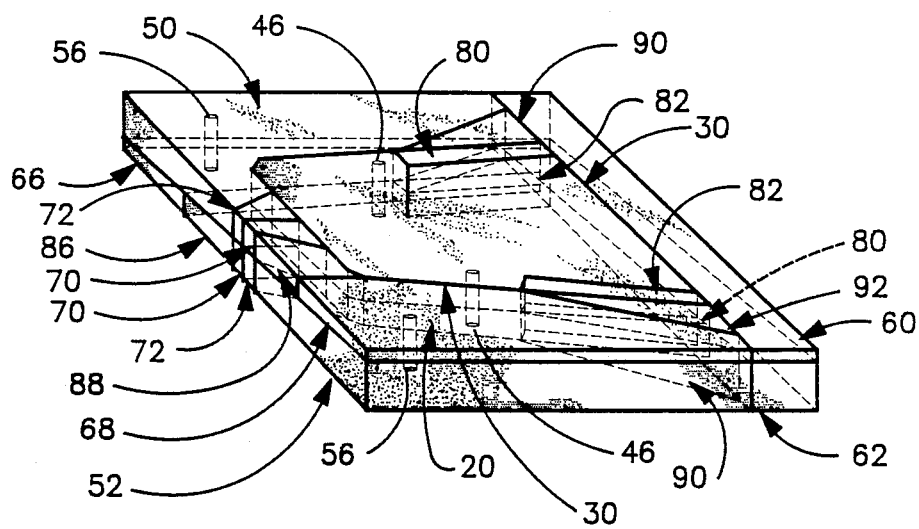

United States Patent [19]

Frost

[11] Patent Number: 4,870,440
[45] Date of Patent: Sep. 26, 1989

[54] STRUCTURE FOR SPATIAL ATTITUDE STABILIZATION OF CAMERA

[76] Inventor: George E. Frost, 6535 S. Race Cir. E., Littleton, Colo. 80121

[21] Appl. No.: 238,777

[22] Filed: Aug. 31, 1988

[51] Int. Cl.$^4$ ............... F16M 11/24; G03B 17/00
[52] U.S. Cl. .................................. 354/293; 248/188.2
[58] Field of Search ............... 354/81, 293; 248/188.2, 248/634, 638

[56] References Cited

U.S. PATENT DOCUMENTS

| | | | |
|---|---|---|---|
| 3,704,848 | 12/1972 | Trebes | 248/163 |
| 3,836,118 | 9/1974 | Meyer | 254/104 |
| 4,027,318 | 5/1977 | Knapp | 354/293 |
| 4,135,335 | 1/1979 | Jensen | 82/126 |
| 4,281,739 | 8/1981 | Keiser | 181/207 |
| 4,545,660 | 10/1985 | Rudolf | 354/82 |

OTHER PUBLICATIONS

Geared Slide Rails Spiratone Catalog Fall 1987 Cat No. 873 p. 29.
Porter's Photo/video pp. 8,41 catalog A 41 1987 Bagpod, pillow pod pellet bag.

Primary Examiner—Michael L. Gellner

[57] ABSTRACT

An ultra lightweight, portable variable composite structure to adjust elevation, spatial attitude and longitudinal positions of an object, such as camera and lens assembly. The structure incorporates some unique exterior surface characteristics upon body members of complementing shapes as a means to enable selectively small increments of adjustment and linear movement of a camera aimed upon a close-up objective The exterior surface texture of a network of a multitude of interlinked portions of cell walls and cell cavities is the body member interface structure that will flex and reposition in response to small increments of thrust applied by an operator upon varied sidewalls of the body members.

The interface surface structure engages any of a wide range of textures and a wide range of angular or inclined orientations of an underlying support surface or of a superimposed object and thereby result in stable repose.

Elevation and spatial attitude and close-up focus distance adjustments may be accomplished without necessitating the operation of screws, knobs, clamps or levers. Furthermore the embodiments of the body members of the versatile composite structure do not require encasement, bonding or embedment of heavy rigid material.

16 Claims, 4 Drawing Sheets

STRUCTURE FOR SPATIAL ATTITUDE STABILIZATION OF CAMERA

BACKGROUND—FIELD OF INVENTION

This invention relates to an ultra lightweight, portable, variable composite structure configured to enable elevation, spatial attitude and longitudinal adjustment and stable repose of an object such as a camera and lens assembly. The structure utilizes the unique exterior surface characteristics of a multitude of portions of cell surface walls and cavities on body members of special complementing shapes as a means to enable selectively small increments of movement in a wide variety of interface attitudes. The structure enables elevation, spatial attitude and closeup focus distance adjustments to be accomplished without necessitating the operation of screws, knobs, clamps or levers.

BACKGROUND—PRIOR ART

Heretofore patents such as U.S. Pat. Nos. 4,545,660, 4,027,318 and 3,704,848 have attempted to solve the problem of stabilizing a camera when used with various accessories such as zoom lens, lens extenders, telephoto lens, and close up lens. These devices required attachment to the camera assembly by a screw type device prior to providing stabilization.

Geared slide rails have been developed for close-up forward and back camera adjustment, however these are heavy.

Furthermore, all the above devices, when used outside of studio conditions, have very limited capability of helping the photographer establish the camera assembly in stable repose when encountering the wide range of environments, such as a great range of surface texture irregularities or sloping surfaces varying from slippery to very lumpy.

Many variations of tripod-like devices have been developed for a variety of photographic equipment, however these increase in weight or complexity of operation when made to accommodate a great range of optic accessories and range of field environment.

Pellet bags, bag pods and pillow pods are lighter weight than the aforementioned devices. However these provide a very limited range in elevation and very limited range of deviation from level line of sight.

Blocking up wedges, workholders and machine supports, such as U.S. Pat. Nos. 4,135,335, 3,836,118, 4,281,739 and UK No. 535,095 are made of a heavy or a hard material, or involve elements that limit the on-site selective choice of adjustments in spatial, angular relationships between interfacing surfaces.

The characteristics of rigid and rubber-like items including wedges and inclined planes heretofore have not served the objective of the photographer desiring an easy to adjust lightweight portable device that would enable a wide range of spatial line of sight adjustment and furthermore enable fine adjustment of distance of camera to close-up objective. The capability of fulfilling these desires when encountering a large variety of field conditions has been a longstanding, unsatisfied need.

OBJECTS AND ADVANTAGES

Accordingly, I claim the following objects and advantages of my invention:

to provide an economical means of stabilization of a camera in a wide range of field conditions, including sloping surfaces of smooth and of very rough texture;

adjust and stabilize a wide range of camera and lens accessories;

to enable selectively small increments of adjustment of camera elevation and line of sight attitudes;

to provide an ultra lightweight support structure that can easily be transported and quickly set up;

to eliminate a necessity to operate knobs, screws, levers and clamps when making attitude and position adjustments;

to provide a support structure possessing interface surfaces that are compatible for adjustment and stable repose with respect to a wide range of surface spatial attitudes and variations of texture of an interfacing material;

to provide a structure of unique configuration as a means to accept a combination of thrust or restraint forces from an operator's thumbs or fingers as a means to enhance refinement of linear close-up focusing upon a photo objective with minimal shift of the objective image within the view finder.

Further objects and advantages of my invention will become apparent from a consideration of the drawings and ensuing descriptions.

DRAWING FIGURES

FIG. 1 shows a side perspective view of closely interrelated body members of a versatile ultra lightweight composite structure.

Figure 2:
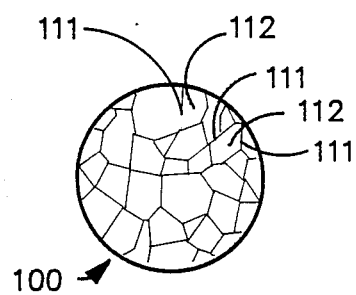
Figure 3:
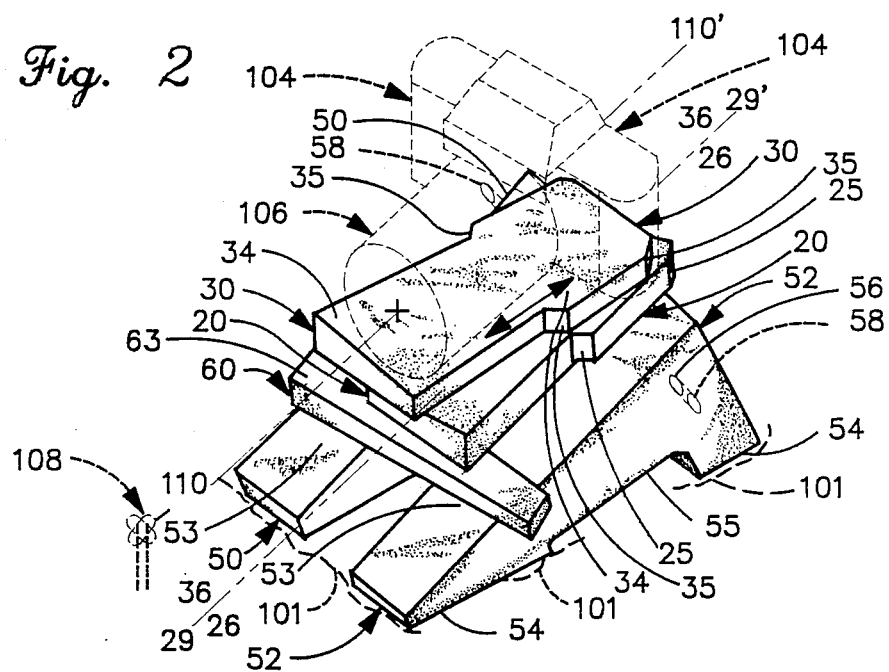
Figure 4:
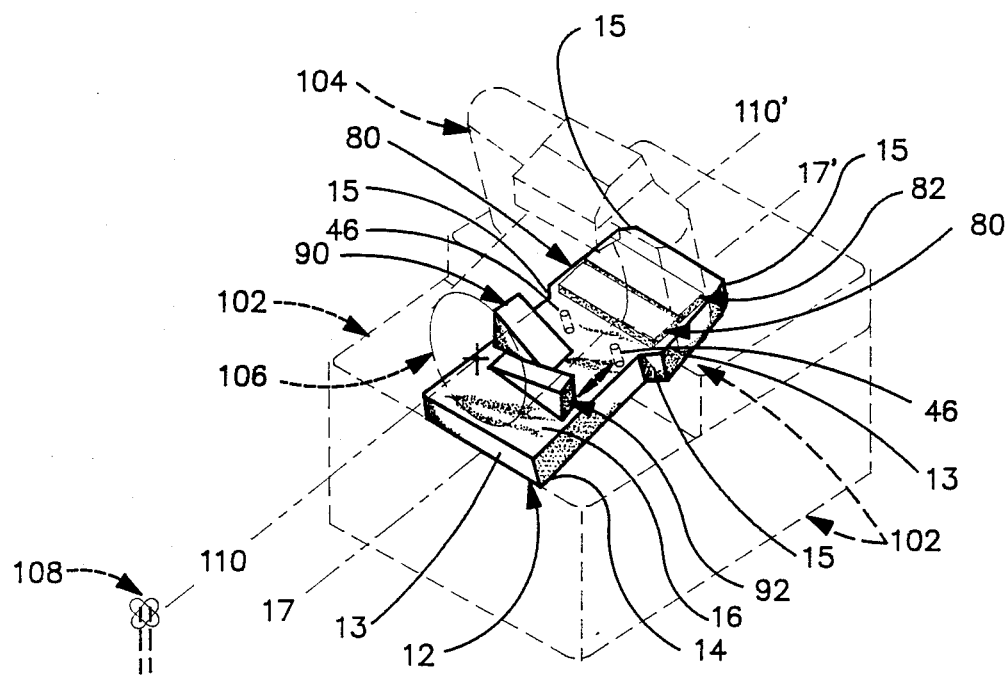
Figure 5:
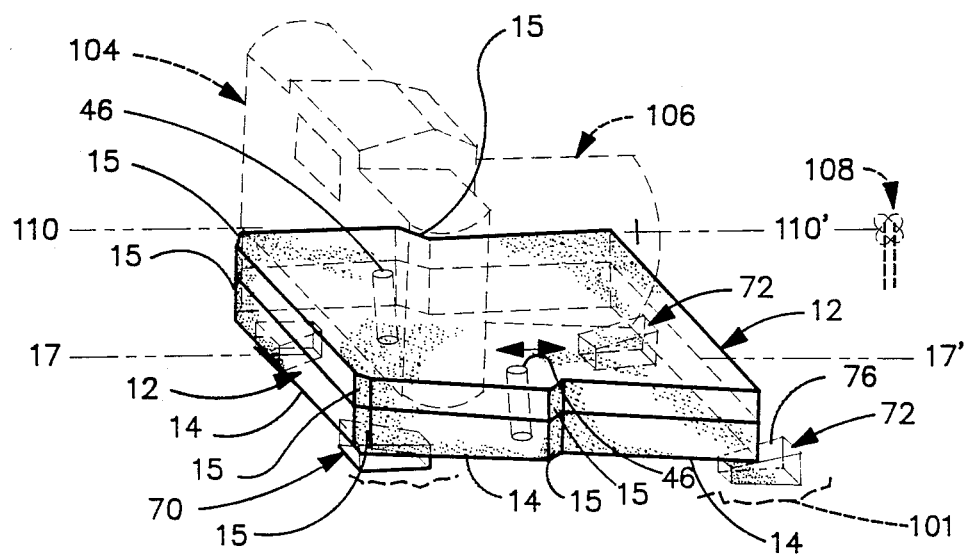
Figure 6:
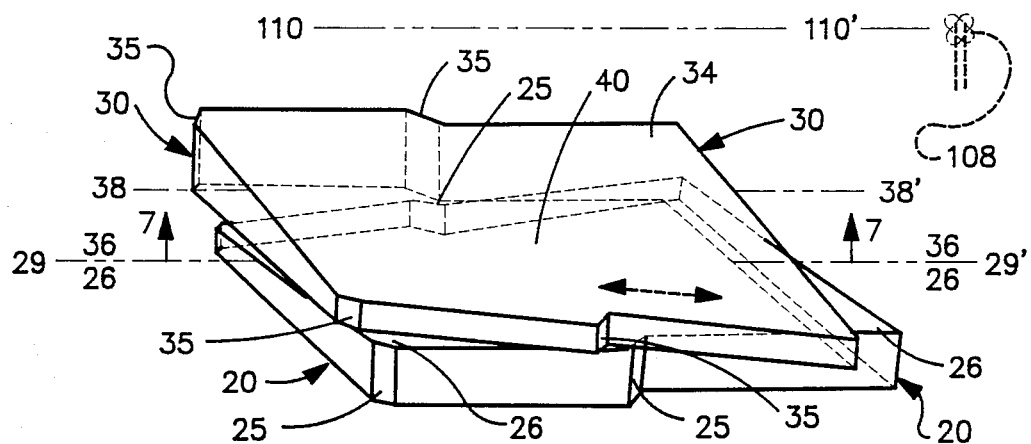
Figure 7:
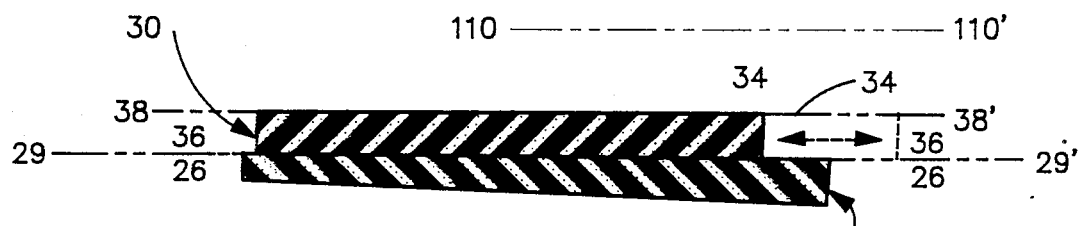
Figure 8:
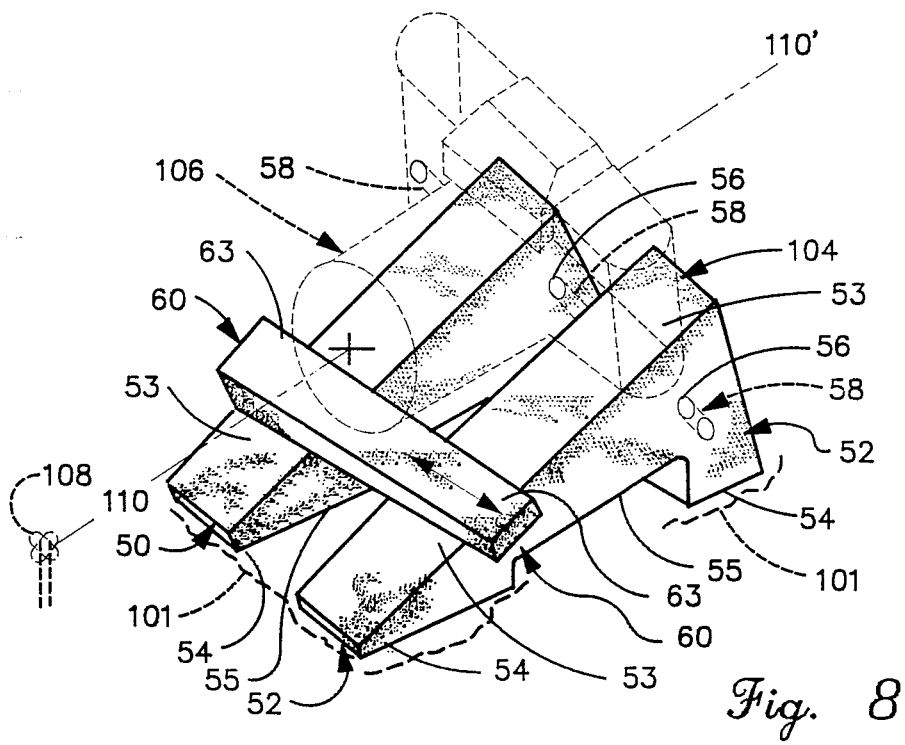
Figure 9:
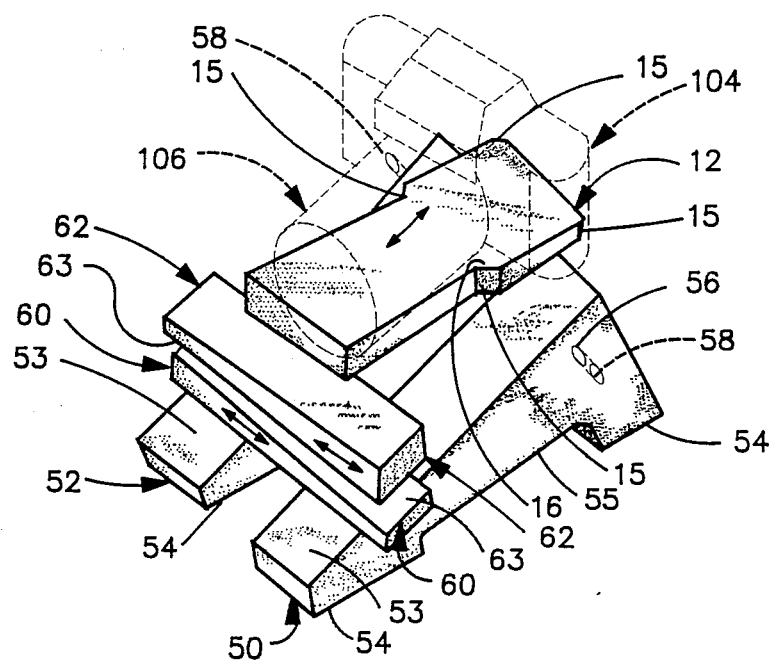
Figure 10:
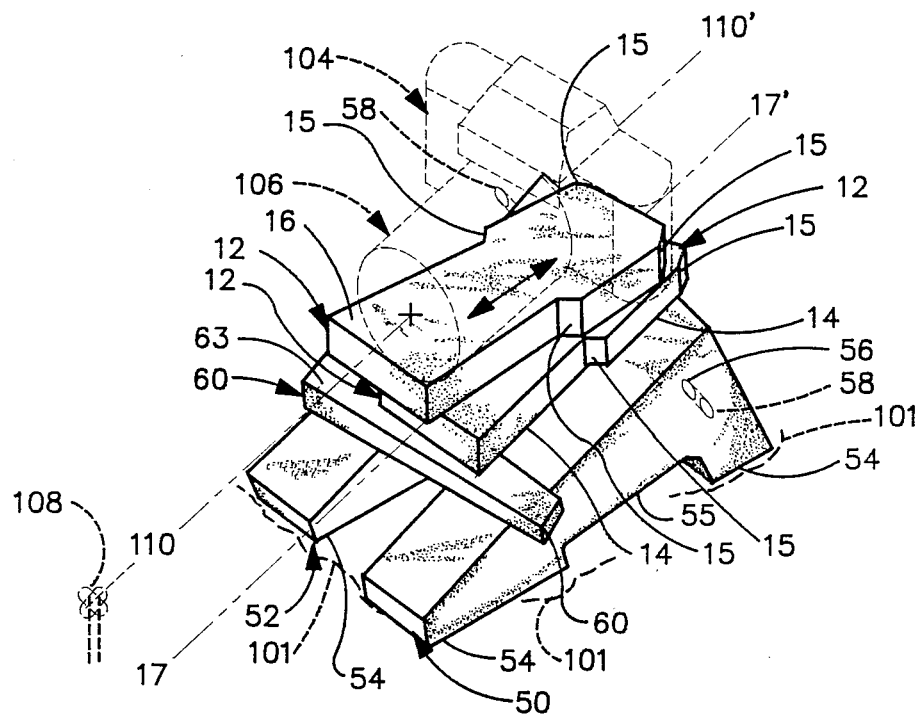

FIG. 2 shows a magnification of a representative sample of exterior surface texture of body members like that exposed by cutting action thru cellular elastomeric material FIG. 3 shows a perspective view of a versatile composite structure for attitude and position adjustment and stable repose of a closeup camera assembly and wherein many optional accessory polyhedron body members are adjustably interfaced and interspaced FIG. 4 shows a perspective view of an elongated slab polyhedron body with unique varied sidewalls as a means of adjusting a close-up camera above a sloping surface FIG. 5 shows a side perspective view of a pair of elongated slab polyhedron body members with optional holes and optional accessory type polyhedron body members FIG. 6 shows a side perspective of a pair of elongated slab polyhedron body members wherein the lower body member is turned to enable the upper body member with camera thereon to be moved along a selected line of slope in the shared interface plane that is parallel to the line of sight FIG. 7 shows an elevation sectional view along the line 7—7 of FIG. 6 illustrating a selected line of slope on the inclined shared interface plane parallel to the line of sight FIG. 8 shows a perspective of a pair of inclined plane polyhedron body members and a generally plank shaped polyhedron body member with outline of camera thereon FIG. 9 shows a perspective of a pair of inclined plane polyhedron body members and a pair of generally plank shaped polyhedron body members with an elongated slab polyhedron superimposed thereon FIG. 10 shows a pair of inclined plane polyhedron body members a wedge plank body member and a pair of elongated slab polyhedron body members adjustably superimposed into a versatile composite structure with close-up camera outlined thereon

LIST OF REFERENCE NUMERALS 12 elongated slab polyhedron body
13 sidewall
14 base exterior surface
15 varied sidewall
16 upper exterior surface
17—17' longitudinal reference line on lower surface
20 elongated slab polyhedron body member
22 exterior base surface of lower body member
23 sidewall of lower body member
25 varied sidewall of lower body member
26 upper interface plane of lower body member
29—29' a selected line of slope upon the upper interface plane of the lower body member
30 elongated slab polyhedron upper body member
34 upper interface plane of the upper slab body member
35 varied sidewall of the upper slab body member
36 lower interface plane of the upper slab body member
38—38' a longitudinal reference line in the upper surface of the upper slab body member
40 selected reference point on shared interface plane as a choice of a turning pivot point
46 hole, as a means to accept a retaining device
50 inclined plane polyhedron body member
52 inclined plane polyhedron body member
53 inclined plane surface
54 base surface
55 arched base wall
56 hole, as a means to accept a longitudinally adjustable cross member
58 cross member outline
60 generally plank shaped polyhedron body member
62 generally plank shaped polyhedron body member
63 inclined plane surface
66 wedge plank polyhedron body member
68 wedge plank polyhedron body member
70 accessory toe polyhedron body member
72 accessory toe polyhedron body member
76 steep pitch inclined plane surface
80 spacer plate polyhedron body member
82 spacer plate polyhedron body member
86 wedge plate polyhedron body member
88 wedge plate polyhedron body member
90 triangular wedge polyhedron body member
92 triangular wedge polyhedron body member
100 resilient cellular elastomer material
101 underlaying basic support surface
102 outline of a field pack
104 outline of a camera
106 outline of a lens assembly
108 outline of a close-up objective
110—110' line of sight of lens
111 interlinked edge portions of cell walls
112 cavities formed by cutting action thru cells

DESCRIPTION—STRUCTURE FOR SPATIAL ATTITUDE STABILIZATION

FIG. 1 shows polyhedron body member structural shapes of a preferred embodiment of the invention in a closely interrelated arrangement for economical production by cutting action thru a complementing pair of wedge strips of cellular resilient elastomeric material. Prime and optional accessory type polyhedron body members are illustrated and numbered therein. Said numerals are included in the List of Reference Numerals with a brief description. FIG. 3 thru FIG. 10 show polyhedron body members selected from the FIG. 1 or an alternative embodiment thereof adjustably interrelated into composite structures for spatial attitude stabilization of a camera. Numeral 12 elongated slab polyhedron shown in FIGS. 4, 5, 9, 10 is an example of an alternative embodiment. Numeral 12 is a simpler embodiment of body members 20 and 30 envisioned by cutting action thru plank material as contrasted to cutting action thru a complementing pair of wedge strips shown in FIG. 1.

FIG. 2 shows magnification of a representative sample of exterior surface texture that is typical of body members in FIG. 1. The texture is like a multitude of interlinked wall portions of cell walls 111 and of cavities 112 formed by cell walls 111 in random orientation as exposed by cutting action thru the resilient elastomeric foam material 100. The inventor believes the interlinked network of portions of cell walls 111, cut or molded, is the outstanding surface character and means whereby the body members engage in stable repose upon a wide range of surface textures and in an exceptionally wide range of inclined attitudes of an interfacing surface.

FIG. 3 shows a versatile composite structure incorporating several prime body members and optional accessory body members selected from FIG. 1 group. The reader will find additional descriptive material relating to the FIG. 3 composite structure as we proceed thru description of FIG. 4 and others.

FIG. 4 shows a perspective of an elongated slab polyhedron body 12 with its base exterior surface 14 in stable repose upon the sloping surface of a field pack 102. Some optional accessory type features are shown in FIG. 4 and briefly described here for convenience of illustration. Optional holes 46, 46 are shown as a means to accept pegs or restraining devices and would be utilized only in extreme attitude situations. The optional accessory polyhedrons 80, 82, 90, and 92 enhance ease of close-up distance focusing when encountering a lens assembly 106 where its lower surface is offset from the base of the body of the camera 104.

The outstanding surface texture of the accessory polyhedron body members has been described under FIG. 2, and applies to their optional interrelationship with other composite structures described in this document. Triangular wedge polyhedron accessory body members 90, 92 are optional, and are shown interspaced under the lens assembly 106 as a means for adjusting and stabilizing the line of sight 110—110' of said camera with respect to the upper surface 16 of the polyhedron body 12. Other optional spacer plate type polyhedrons 80, 82 are shown interspaced upon the upper surface 16 of the elongated slab polyhedron body and beneath the camera 104 as a means of shimming up and stable repose of said camera 104. These optional accessory body members provide the capability of refining the line of sight 110—110' of the camera parallel to the base exterior surface 14 of the elongated slab polyhedron body member 12. Line 17—17' represents a selected reference line in the base exterior surface 14 that is parallel to the line of sight 110—110'.

Subsequent linear movement of the elongated slab polyhedron 12 (with camera reposing thereon) along reference line 17—17' enables close-up distance focusing upon a photo objective with minimal shift of the objective image within the viewfinder. Varied side walls 15 shown at sides of the elongated slab polyhedron body member 12 accept selective combinations of thumb or finger thrust or restraining pressure and thus are the means to impart linear movement of said elongated slab polyhedron body 12 with respect to any underlying support surface such as the shown field pack outline 102. The inventor is convinced that the resilient network of a multitude of interlinked portions of cell walls 111 when molded or when exposed by cutting action as shown in FIG. 2 is the outstanding character and means whereby the polyhedron body member can be moved in selectively small increments over a wide variety of surface texture and range of inclined orientation of an interfacing surface. The random orientation of the exposed portions of the multitude of cell walls 111 enables random elements of the network of cell walls to flex and reposition in random patterns in response to applied increments of thrust. Similarly, the interlinked network of a multitude of exposed edges of resilient cell walls 111 is the outstanding surface structure and texture whereby the polyhedron body member engages and grips on an interface surface in a wide range of angular or inclined orientations immediately when operator applied thrust ceases. The said surface texture and structure similarly enables selectively small increments of angular refinement of position at its interfaces.

FIG. 5 shows a side perspective of a pair of similar superimposed elongated slab polyhedron body members 12, 12. The exterior base surface 14 of the lower body member may reside directly upon an underlying basic support surface 101. However FIG. 5 shows two like optional accessory body members 70, 70 interspaced below the lower elongated slab polyhedron body member 12 as a means to bridge over any irregularity in the underlying basic support surface 101. FIG. 5 also shows two like optional accessory toe polyhedron body members 72, 72 positioned with a steep pitch inclined plane surface 76 interspaced under the lower edge of the lower elongated slab body member 12. These optional accessory toe polyhedron body members are a blocking up means to selectively refine the spatial attitude of the superimposed pair of elongated slab body members and an object such as a camera 104 reposing thereon.

An added advantage of adjusted spatial attitude may be observed in regard to close-up distance focusing upon a close-up objective. Observe that the upper elongated body member 12 of the composite structure supporting the camera 104 may be linearly advanced along a line 17—17' parallel to the camera line of sight 110—110'. Thus a minimal shift will occur in the framing of the objective image within the viewfinder. The optional accessory toe polyhedron body members described above may be used to provide this desired spatial attitude of the lower elongated slab polyhedron. Subsequent linear movement of the upper body member 12 along a parallel shared interface plane may be produced by a selective combination of thumb or finger thrust or restraining pressure upon the varied sidewalls 15, 15 of the upper body member 12 and restraining pressure of thumb and finger upon the varied sidewalls 15 of the lower body member 12.

The exterior surface structure common to each of the body members described and interfacing herein is illustrated in FIG. 2. The special character of these interfacing surfaces enables linear or rotational relative movement at the interface surface in response to selective combination of thumb and finger thrust or restraining pressure at the above described varied sidewalls.

The random orientation of the exposed portions of the multitude of cell walls 111 enables random elements of the interlinked network of cell walls to flex and reposition in random patterns in response to applied increments of thrust. Similarly the interlinked network of a multitude of exposed edges of resilient cell walls 111 is the outstanding surface structure and texture whereby the polyhedron body member engages and grips the interfacing surface immediately when operator applied thrust ceases.

Holes 46,46 illustrate an option as a means to accept a restraining device such as a peg to limit camera body movement when encountering extreme attitude situations.

In FIG. 6 the lower body member 20 of a pair of elongated slab polyhedron body members is turned beneath the upper body member 30 to illustrate the special inclined plane feature. A camera line of sight 110—110' is shown in stable relationship with respect to the upper surface 34 of the upper body member 30. Details of the camera 104 and lens assembly 106 (in stable repose upon the upper surface 34 of the body member 30) have not been shown here, thus enabling a clearer view of the special shape features of the slab body members 20,30.

The inclined interface feature enables appropriate selection of a line of slope 29—29' upon the shared upper interface plane 26 of the lower body member 20 whereby subsequent close-up camera distance focusing upon a close-up objective 108 may be accomplished with minimal shift of the objective image within the viewfinder. The desired linear movement of the camera along the camera line of sight 110—110' aimed upon the close-up objective 108 may be accomplished by linear movement of the upper body member along a line 29—29' that has been appropriately selected parallel to the line of sight 110—110'.

The varied sidewalls 25 of the lower body member 20 are structure features to accept selected combinations of thumb or finger thrust or restraining pressure as a means to position the lower body member 20. The varied side walls 35 of the upper body member 30 are structure features to accept selected combinations of thumb or finger thrust or restraining pressure as a means to control angular deviations or linear movement of the upper body member 30 upon the shared common interface plane 26, 36 of the lower body member 20.

The exterior surface structure common to each of the body members described and interfacing herein is illustrated in FIG. 2. The outstanding character of this surface structure has been explained in earlier descriptions and also applies as a means to enhance the quality of adjustment and stable repose at the interfaces of the above structure.

In FIG. 7, the partial elevation sectional view taken along line 7—7 of FIG. 6 shows an appropriately selected slope line 29—29' on the upper surface of the lower elongated slab polyhedron body member 20. The figure illustrates in outline how the line of sight 110—110' (aimed at the photo objective 108) may reside in stable relationship with respect to the upper elongated slab polyhedron body member 30.

The feature of the interfacing inclined planes 26, 36 of the body members 20. 30 is the means to enable selection of the appropriate line of slope 29—29' that is parallel to the line of sight 110—110'. Subsequent linear movement of the upper body member 30 (with the camera 104 and lens assembly 106 in stable repose thereon) along the selected line 29—29' is the means enabling close-up distance focusing with minimal movement of the objective image within the frame of the viewfinder.

In FIG. 8 a versatile composite structure is shown. Its basic pair of inclined plane body members 50, 52 are generally spaced apart with sidewalls rising upward from their respective base surfaces 54 to their respective inclined plane surface 53. An arched wall 55, 55 in the base surface of each of the body members is a feature to enhance the stability of the body members by bridging over surface irregularities on the underlying basic support 101 upon which the composite structure is placed. Optional holes 56 are shown thru each of the inclined plane body members as a means to accept an optional tube-like cross member 58 (shown in outline form) in a longitudinally adjustable manner and thereby enhance the body members' capability to adjustably support a camera assembly above a sloping or irregular underlying basic support 101.

A generally plank shaped polyhedron body member 60 is shown positioned in a crossways manner resting upon selected portions of the inclined plane surface 53 of the body members 50, 52.

The outline of lens assembly 106 is shown in stable respose upon a selected portion of the upper surface of the plank body member 60. An outline of the associated camera body 104 is shown in stable repose on selected portions of each of the inclined plane surfaces 53.

The inventor is convinced that the stable repose of the camera interfacing at this challenging angular attitude is accomplished by means of the outstanding structure of the exterior surface of the polyhedron body members. The structure of the exterior surface has been illustrated magnified in FIG. 2. The flex, reposition and stable repose characteristic of the surface structure composed of an interlinked network of a multitude of portions of cell walls is included in previous descriptions herein.

Large increments of change of lens assembly 106 line of sight 110—110' elevation angle may be accomplished by selecting appropriate portions of the inclined plane surfaces 53, 53 as the support point for the plank shaped body member 60 and for the edge of the camera body 104. Selectively small increments of longitudinal position change of the generally plank shaped polyhedron body member 60 enable the inclined plane surface 63 of that body member to produce vernier-like increments of elevation of the line of sight 110—110'.

FIG. 9 shows complementing and interrelated polyhedron body members integrated into the previously described versatile composite structure FIG. 8. Herein a pair of generally plank shaped polyhedron body members 60, 62 are shown with inclined plane surfaces 63, 63 meeting in a complementing manner on a shared interface plane. Subsequent longitudinal repositioning of body member 60 with respect to body member 62 creates substructure for fine blocking up of another body member thereon while maintaining a parallel relationship between the outer surfaces of this sub-structure. The elongated slab polyhedron body member 12 is shown superimposed upon the above described structure. thus creating a stable plane 16 upon which the camera 104 and lens assembly 106 may repose for subsequent refinement of spatial attitude and for close-up focusing.

FIG. 10 shows a pair of elongated slab polyhedron body members 12, 12 of FIG. 5 superimposed upon the previously described versatile composite structure FIG. 8 in a complementing and interrelated manner. The outline of camera 104 with lens assembly 106 is shown residing upon the upper surface 16 of the upper body member 12. The outstanding surface structure of the body members in combination with the interfacing shapes are the means whereby the selectively small increments of adjustment result in stable repose within a wide range of spatial attitude. Details regarding the interface areas have been included earlier in this document.

Returning now to FIG. 3 showing a versatile composite structure we observe prime body members of FIG. 8 with the prime body members of FIG. 6 superimposed thereon. This creates an exceptionally lightweight versatile composite structure for adjustment and stable repose of a camera 104 and close-up lens assembly 106 outlined thereon. Special features of this structure combine as a means to enable linear movement for refining critical focusing upon a close-up objective and thus minimize movement of the objective image within the viewfinder.

In contrast consider the pounds of weight of a slide rail and pinion device upon a sturdy tripod to adjust and stabilize such a system in field type objective settings. Set up and adjustment sequences for the rail and tripod devices require operation of many controls such as screws, knobs. clamps and levers. The versatile composite structure of FIG. 3 weighs a small fraction of a pound and does not require any screws, knobs, clamps or levers.

Features of the lightweight versatile composite structure unite the inclined plane body members 50, 52 that are a means to adapt to a wide range of basic underlying surface 101 slopes and irregularities; with the one or more generally plank shaped polyhedron body members 60, 62, 66, 68 superimposed upon selected portions of the inclined surfaces 53, 53 as a means to selectively elevate the elongated slab polyhedron body members 20, 30. The inclined plane forms of the pair of the elongated slab body members 20, 30 are the means to enable selectively small increments of relative angular movements of said pair 20, 30 upon their shared interface plane 26,36. Thus the upper interface surface 34 of the upper elongated body member 30 may support the camera 104 and lens assembly 106 in stable repose thereon with the line of sight 110—110' aimed at the close-up objective 108. Subsequent selectively small linear movement of the upper body member 30 upon the common interface plane 26,36 shared with the lower body member 20 is the means to enhance the close-up distance focusing. Details of the varied sidewalls 35, 25 of the upper body member 30 and of the lower body member 20 as a means to accept the selected combination thumb or finger thrust or restraining pressure in a manner to move the upper body member along a selected slope line 29—29' in their shared interface plane 26, 36 appear in previous descriptions.

The special features of the body members of the versatile composite structure thus have interrelated as a means to adjust elevation and spatial attitude of a camera and subsequently enable close-up distance focusing upon an objective with minimal movement of the close-up objective within the frame of the viewfinder.

While the above description contains many specificities, the reader should not consider these as limitations on the scope of the invention, but merely exemplifications of preferred embodiments thereof. Those skilled in the art will envision many other possible variations are within its scope. For example, skilled artisans will readily be able to change dimensions and shapes of the various embodiments. They will be able to make the structures of alternative materials varying in density and resiliency. Alternative materials could include molded plastics with varied texture of the interfacing exterior surfaces. Accordingly the reader is requested to determine the scope of the invention by the appended claims and their legal equivalents, and not by the examples which have been given.

I claim:

1. An ultra lightweight versatile structure as a means for angular attitude and position adjustment and for stable support for an object such as a camera and close-up lens assembly or the like, comprising:

a generally elongated slab polyhedron body predominately of resilient cellular elastomeric material;

exterior interfacing surfaces of said body of a texture of a network of a multitude of interlinked portions of cell walls and of cavities formed of cell walls in random orientation cut or molded from the said resilient cellular elastomeric foam material;

said surface texture of said body polyhedron as a means enabling a network of a multitude of resilient portions of cell walls to flex and reposition in response to selectively small increments of thrust applied to said body member and immediately engage and grip any of a wide range of surface texture on an interfacing body;

said surface texture furthermore is a means to engage said interfacing bodies in a wide range of angular or inclined orientations and immediately result in stable repose with respect thereto;

said surface texture on the predominate base surface as a means to selectively position the said structure on a wide variety of level or sloping surfaces, such as earth terrain, the hood of a car, or sloping surface of a field pack that is variable in surface attitude;

a plurality of sidewalls of said slab polyhedron body varied in shape as a means to accept a combination of thumb and finger thrust or restraining pressure;

said variations in sidewalls as a means to enable said combination of thrust and pressure to linearly reposition said elongated polyhedron along its base surface and in the direction of any compass azimuth bearing and as a means to selectively hold or to modify the angular azimuth orientation of said elongated polyhedron with respect to a compass bearing.

2. An invention according to claim 1 wherein additionally one or more generally triangular wedge polyhedron body members are adjustably positioned upon said elongated polyhedron body as a means for elevation adjusting and stable support of the lens assembly and wherein the said accessory triangular wedge shaped polyhedron comprises:

body material predominently of resilient cellular elastomeric material, exterior interfacing surfaces of a surface texture as described in claim 1, said surface texture as a means to enable selectively small increments of angular adjustment and of linear adjustment and subsequent stable repose with respect to an interfacing material in a wide range of attitudes in a manner desired in claim 1.

3. An invention according to claim 1 and additionally wherein one or more accessory toe polyhedron body members are utilized in a composite structure and adjustably positioned under the edge or body of the said elongated slab shaped polyhedron body as a means for interfacing with an irregular underlying base surface and furthermore as a means for enabling selectively making small refinements in the angular attitude of the said elongated slab polyhedron or for changes in the elevation of angular attitude of the said object supported on said slab shaped polyhedron;

exterior surfaces of said toe polyhedron body members of a texture of a network of a multitude of portions of cell walls and of cavities formed by cell walls in a random orientation cut or molded from resilient cellular elastomeric material;

said surface texture furthermore is as a means to engage said interfacing bodies in a wide range of angular or inclined orientations and immediately result in stable repose thereon.

4. An invention according to claim 1 and additionally wherein one of more spacer plate type polyhedrons are interspaced upon the upper face of the upper surface of said elongated slab polyhedron and beneath the body of the object such as the camera body as a means for shimming up and stable repose of said body;

exterior surface of said spacer plate type polyhedrons of a surface texture of a network of a multitude of interlinked portions of cell walls and of cavities formed of cell walls cut or molded of cellular resilient elastomeric material.

5. An ultra lightweight composite structure as a means for selective angular attitude and longitudinal position adjustment and for stable support for an object such as a camera with close-up lens assembly or the like, comprising:

a pair of superimposed generally elongated slab polyhedron body members, each predominately of resilient cellular elastomeric material;

exterior interface surfaces of said body members of a texture of a network of a multitude of interlinked portions of cell walls and of cavities formed by cell walls in random orientation cut or molded of resilient cellular elastomeric material;

said surface texture of said body members as a means enabling a multitude of resilient portions of cell walls to flex and reposition in response to small increments of lateral thrust and immediately to engage and grip any of a wide range of surface texture on an interfacing body;

said surface texture furthermore is a means to engage said interfacing bodies in a wide range of angular or inclined orientations and immediately result in stable repose of the object, such as the camera, thereon;

said surface texture on the predominate base surface as a means to selectively position the said structure on a wide variety of level or sloping surfaces, such as earth terrain, the hood of an automobile, or the sloping surface of a field pack that is variable in surface attitude;

a plurality of said sidewalls on each of said slab shaped polyhedrons of varied shape as a means to accept thumb or finger thrust or restraining pressure;

said varied sidewalls as a means to accept the resultant of the said combination of the thrust and restraining pressure and as a means to refine the angular and the longitudinal positions of either member of the said pair of elongated slab shaped polyhedrons with respect to any reference point and with respect to any reference line, in their shared interface plane.

6. An invention according to claim 5 and additionally wherein one or more holes are provided in one or more body members as a means to accept one or more pegs or retaining devices.

7. An invention according to claim 5 wherein the shared interface plane is inclined with respect to the said lower surface of the said lower body member and inclined with respect to the said upper surface of the said upper body member;

the said inclined surfaces of the said shared interface plane as a means to enable selectively small incremental linear movement of the said upper body member with the camera thereon along any selected line in the said shared interface plane;

the said shared inclined interface plane as a means enabling the unique option of selecting a line of slope upon the upper interface of the said lower body member that is parallel to the line of sight of the camera as it resides upon the upper surface of the said upper slab polyhedron body member;

said varied sidewalls as a means to accept said selected combination of thumb or finger thrust or restraint pressure acting upon their respective varied sidewalls of said slab polyhedron body members as the means to produce linear relative movement along any said selected slope line of the interface and thereby enhance refinement of the close-up focusing upon the photo objective with minimal shift of the objective image within the viewfinder.

8. An invention according to the general form of claim 7 molded or plastic material wherein surface texture of the upper and of the lower surfaces of the body members is varied as described therein. Said surface texture of a network of a multitude of interlinked portions of cell walls as a means enabling selectively small increments of movement and subsequent stable repose with respect to interfacing surfaces in selected spatial attitudes as described in claim 7.

9. An invention according to claim 5 and additionally wherein one or more triangular wedge polyhedron body members are interspaced as a means for vernier-like incremental blocking up support under the lens assembly and as a means for adjusting and for stabilizing the line of sight of said camera with respect to the upper surface of the said polyhedron;

exterior surfaces of said triangular wedge polyhedron body members of a texture of a multitude of resilient interlinked wall portions of cell walls and of cavities formed in random orientation cut or molded of resilient cellular elastomeric material;

said surface texture of said body members as a means for enabling a multitude of resilient portions of cell walls to flex, engage and grip a wide range of surface texture.

10. An invention according to claim 5 and additionally wherein one or more accessory toe polyhedron body members are interspaced under the edge or the lower surface of lower elongated slab polyhedron body member and upon any of a wide variety of sloping or irregular surfaces of the underlying basic support material;

exterior interfacing surfaces of the said accessory toe polyhedron body members of a surface texture as described in claim 5. Said surface texture as a means to enable selectively small increments of angular and linear adjustment and subsequent stable repose with respect to interfacing material in a wide range of attitudes as described in surface texture portions of claim 5.

11. An invention according to claim 5 and additionally wherein one or more spacer plate type polyhedrons are interspaced upon the upper surface of a said pair of elongated slab shaped polyhedrons and beneath the body of the object such as a camera body as a means of shimming up and stable repose of said camera body.

12. An ultra lightweight versatile composite structure as a means for angular attitude and position adjustment and for stable support for an object such as a camera or the like comprising:

a pair of inclined plane polyhedron body members generally placed side by side, each with one or more upward sloping inclined plane surfaces and each including the following;

body predominately of resilient closed cell elastomeric foam material;

exterior interface surfaces of a texture of a network of a multitude of thin wall portions of cut cells and of cavities formed by cell walls in random orientation cut or molded from resilient cellular elastomeric material;

an arch portion in the base side of the said inclined plane body member as a means to enhance stability by bridging over surface irregularities in the base support material upon which the said versatile support structure is placed;

one or more generally plank shaped accessory polyhedron body members adjustably positioned as a crossways body member upon selected portions of the inclined plane surface of the said composite structure as a means to adjust and stabilize the lens assembly or body portions of a camera assembly as they repose upon the said composite structure;

said interface surface texture of said body members as a means for enabling a network of a multitude of resilient interfacing portions of cell walls to flex and reposition in response to small increments of thrust applied by the operator and to immediately engage and repose upon any of a wide range of surface texture on said interfacing body when said thrust is removed;

said interface surface texture furthermore as a means to engage other interfacing surfaces in a wide range of angular or inclined orientations and thereby result in stable repose.

13. An invention according to claim 12 wherein one or more holes are provided thru each of the said inclined plane polyhedron body members as a means to accept one or more tube-like cross members in a longitudinally adjustable manner and as a means to stabilize the sidewalls of said polyhedrons in an attitude predominately normal to a level or sloping surface such as the hood of a car or with respect to an irregular base support such as the variable surface of a field pack.

14. An invention according to claim 12 and additionally wherein the polyhedron of the versatile structure of claim 1 is adjustably superimposed upon the upper surfaces of the composite body members of said composite structure of said claim 12 as a means of providing a stable and interrelated composite support structure for an object such as a camera with close-up lens assembly.

15. An invention according to claim 12 and additionally wherein a pair of elongated polyhedron body members of claim 5 are selectively and positionally superimposed thereon as a means for building up a closely interrelated composite stable structure as a means for enhancing the selectively small increments of adjustments of spacial attitude, position and of stable repose stated within the said claims.

16. An invention according to claim 12 and additionally wherein a pair of elongated slab polyhedron body members of claim 7 are selectively and positionally superimposed thereon as a means for building up a closely interrelated composite stable structure and as a means for enhancing the selectively small increments of adjustment of spatial attitude, position and of stable repose stated within said claims.

* * * * *